3,684,515
COLOR PHOTOGRAPHIC MATERIAL
Walter Schulte, Opladen, Immo Boie, Cologne, Helmut Mader, Odenthal-Hahnenberg, and Rigobert Otto, Leverkusen, Germany, assignors to Agfa-Gevaert Aktiengesellschaft, Leverkusen, Germany
No Drawing. Filed Aug. 26, 1970, Ser. No. 67,255
Claims priority, appplication Germany, Sept. 2, 1969,
P 19 44 440.7
Int. Cl. G03c 1/40
U.S. Cl. 96—100
3 Claims

ABSTRACT OF THE DISCLOSURE

Cyan-forming coupler of the following formula

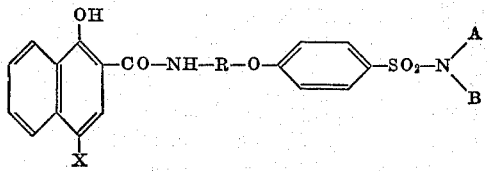

wherein
X is hydrogen, halogen or sulfo,
R is a hydrocarbon chain, and
A and B are hydrogen, alkyl, cycloalkyl, aralkyl or aryl or together complete a teterocyclic ring,
yield on color-forming development cyan dyes with high transmission for blue light and high stability to moist heat. The couplers can be used in combination with red masking couplers.

---

The invention relates to a color photographic material which contains new cyan-forming couplers and which is improved both in its color reproduction and stability.

In color photographic materials which are processed by chromogenic development to produce color photographs, it is known to build up the cyan part of the image from color-forming couplers which generally consist of derivatives of phenols or naphthols. Although numerous of such cyan-forming couplers are known, there is no cyan-forming coupler which ideally fulfils the many requirements necessary in photographic practice. In fact, most color-forming couplers have serious disadvantages. Thus, insufficient stability of the residual coupler which has not been coupled with the color-forming developer to produce the dye image often causes discoloration of the image whites. The image dyes produced by coupling with oxidized color-forming developer frequently do not have the required absorption maximum and furthermore may manifest undesirably high side absorptions. Many dyes separate out in the form of comparatively coarse color grains, whereas in other cases the coupling reaction is too slow. Quite generally, the cyan dyes which are obtainable by chromogenic development tend to have insufficient stability to light, unsatisfactory resistance to hydrolysis and have an inconveniently high sensitivity to reducing agents.

Furthermore, many cyan-forming couplers have little or no kinetic compatibility with azo red masking couplers and, therefore, cannot be used in color corrected, or so-called masked, materials.

It is, therefore, an object of this invention to find cyan-forming couplers which can be developed chromogenically to yield dyes which have improved absorption properties and increased stability and which do not themselves tend to yellow.

It has now been found that 1-hydroxy-2-naphthamides of the following general formula are particularly suitable for use as cyan-forming couplers in photographic silver halide emulsion layers:

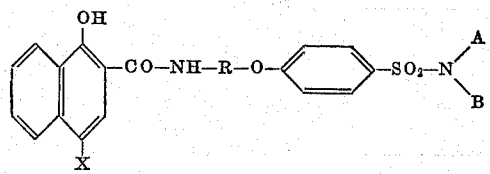

In the above formula:

X = a hydrogen atom or a halogen atom such as a fluorine, chlorine or bromine atom, or is a sulphonic acid group;
R = a saturated, linear or branched bivalent hydrocarbon chain containing up to 18 carbon atoms, preferably 2 to 6 carbon atoms;
A = a hydrogen atom, or a linear or branched alkyl group containing up to 20 carbon atoms, a cycloalkyl group, such as cyclohexyl, an aralkyl group such as benzyl or phenylethyl, or an aryl group such as phenyl; and
B = a linear or branched alkyl group containing up to 20 carbon atoms, a cycloalkyl group such as cyclohexal, an aralkyl group such as benzyl or phenylethyl, or an aryl group such as phenyl; or A and B together with the nitrogen represent a 5-, 6- or 7-membered heterocyclic ring which may contain a further hetero atom such as piperidine, pyrrolidine, hexamethylene imine or morpholine.

The following are examples of suitable couplers:

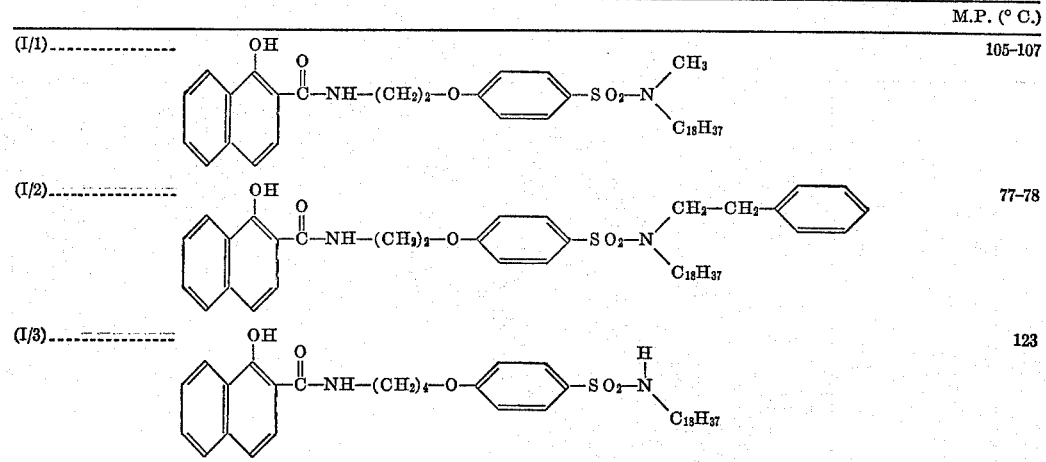

M.P. (° C.)
(I/1) ......... 105–107
(I/2) ......... 77–78
(I/3) ......... 123

| | | M.P. (° C.) |
|---|---|---|
| (I/4) | [structure] | 75 |
| (I/5) | [structure] | 76 |
| (I/6) | [structure] | 61–64 |
| (I/7) | [structure] | 96–98 |
| (I/8) | [structure] | 86 |
| (I/9) | [structure] | Oil |
| (I/10) | [structure] | 148 |
| (I/11) | [structure] | ———— |
| (I/12) | [structure] | ———— |
The synthesis of the cyan-forming couplers according to the invention is explained with the aid of the following reaction scheme:
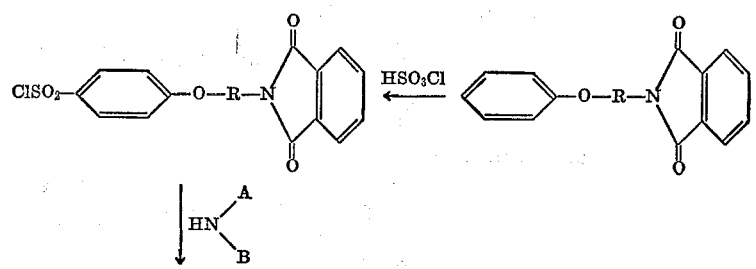

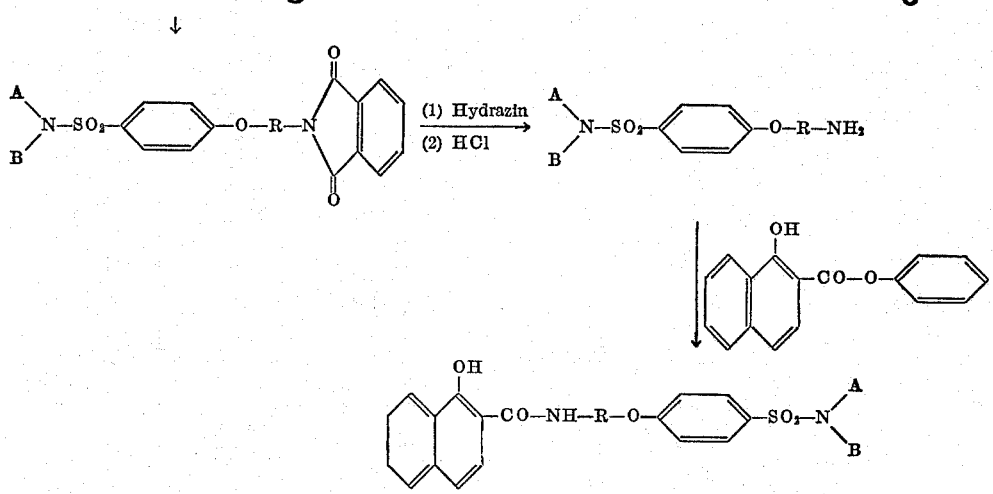

The synthesis of coupler I/5 is described in detail below.

Preparation of coupler I/5

(a) N-[4-(p-chlorosulfophenoxy)-butyl]-phthalimide. 375 g. of chlorosulfonic acid are added at −2° C. to a solution of 245 g. of N-(4-phenoxylbutyl)-phthalimide in 1.8 litres of absolute chloroform. The mixture is then stirred without cooling for 10 minutes and heated at 50° C. for one hour. After the addition of 600 g. of sodium chloride, the reaction mixture is poured onto 400 g. of anhydrous sodium carbonate and filtered under suction, and the solution is evaporated to dryness. The residue is recrystallized from benzene. M.P. 130° C.; yield 120 g.

(b) N-[4 - (p-N'-methyl-N'-n-octadecylsulfamyl-phenoxy)-butyl]-phthalimide.—13.4 g. of methyl-n-octadecylamine are dissolved in 200 ml. of hot anhydrous tetrahydrofuran and 7 ml. of triethylamine, and 22 g. of N-[4-(p-chlorosulfophenoxy)-butyl] - phthalimide are added. After one hour's boiling, the reaction product is precipitated with a mixture of ice and hydrochloric acid, removed by suction filtration, washed with water and recrystallized from propanol. M.P. 107–108° C.; yield 20 g.

(c) 4-(p-N'-methyl-N'-n-octadecylsulfamylphenoxy)-1-butylamine.—20 g. of methyl-n-octadecylamine are boiled for one hour with 150 ml. of ethanol and 2 g. of hydrazine, acidified with HCl, and boiled under reflux for ½ hour. The reaction mixture is then stirred into a mixture of sodium carbonate solution and ice, filtered under suction and washed with water, and the residue is recrystallized from propanol. M.P. 90 to 95° C.; yield 15 g.

(d) 1 - hydroxy - N-[4' - (p-N'-methyl-N'-n-octadecylsulfamylphenoxy)butyl] - 2-naphthamide. Coupler I/5.— 15 g. of methyl-n-octadecylamine and 9 g. of phenyl 1-hydroxy-2-naphthoate are heated to 160° C. and 0.1 mm. Hg for one hour. When cold, the residue is recrystallized from propanol. M.P. 76° C.; yield 12 g.

The cyan dyes obtained from the new color-forming couplers by chromogenic development have advantageous spectral properties. Their absorption curves have steep flanks and only a slight yellow side density. High permeability to blue light is therefore obtained. The new cyan dyes have greater stability to moist heat and light than cyan dyes obtained from known color-forming couplers of similar structure. The tendency of color-forming couplers which have not been coupled to discolor the layer is slight. Another advantage is that the new color-forming couplers if they are water-insoluble have low melting points and are highly soluble in organic solvents such as ethyl acetate or methylene chloride. They can, therefore, be easily emulsified in gelatin. The use of oil-forming agents is therefore unnecessary. A special advantage of the new cyan-forming couplers is their good kinetic compatibility with certain azo red masking couplers, e.g. those described in German patent application P 19 44 441.8 which correspond to the following general formula:

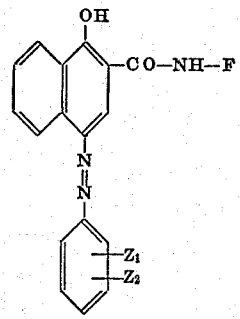

F = a long chain alkyl group containing 10 to 20 carbon atoms or the group

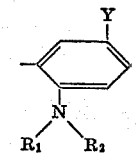

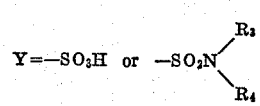

$Z_1$ and $Z_2$ = the same or different groups —$COR_5$ or —$SO_2R_5$, $R_1$, $R_2$, $R_3$ and $R_4$, which may be the same or different, are hydrogen or alkyl groups, but at least one of the said radicals is an alkyl group containing 10 to 20 carbon atoms which renders the compound resistant to diffusion, and $R_5$ = —OH, an alkoxy group containing preferably 1 or 2 carbon atoms or an unsubstituted or substituted amino group.

The following are examples of compounds which are eminently suitable for use together with the cyan-forming couplers according to the invention:

II/1

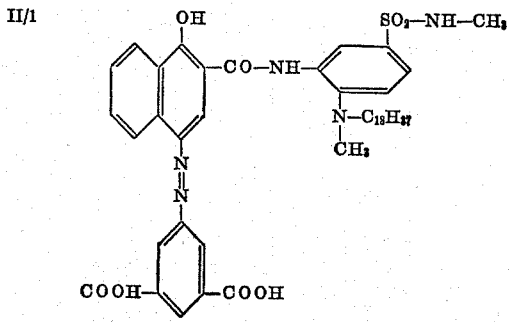

II/2 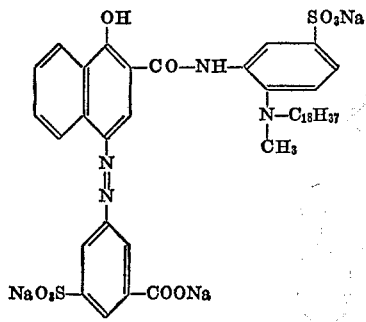

II/7 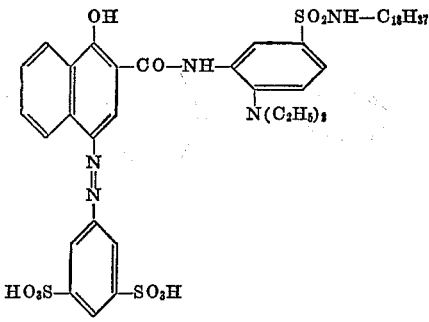

II/3 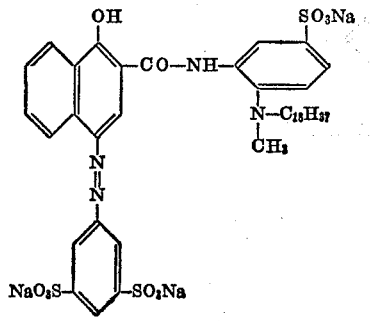

II/8 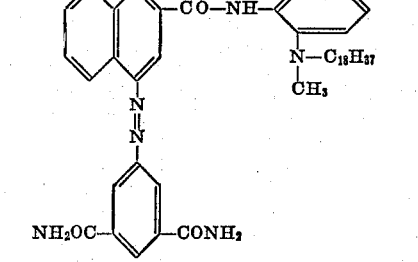

II/4 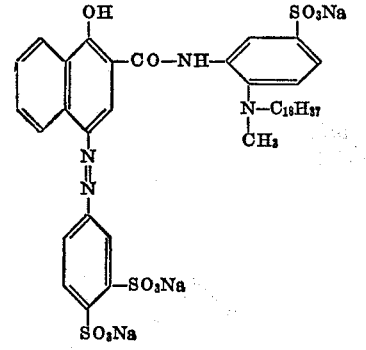

II/9 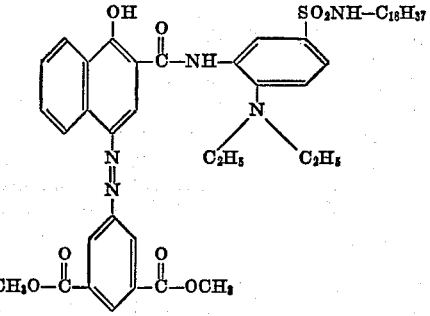

II/5 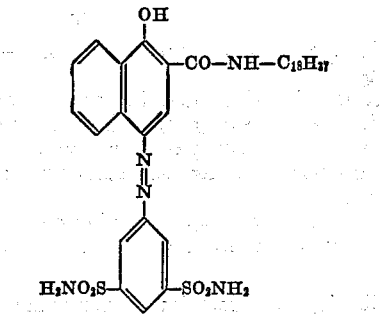

II/10 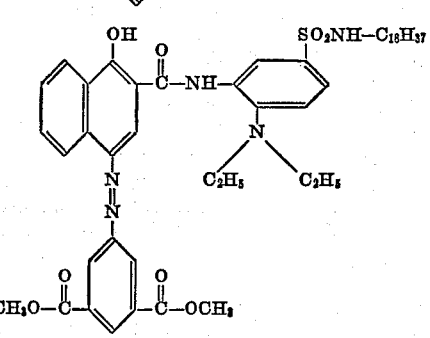

II/6 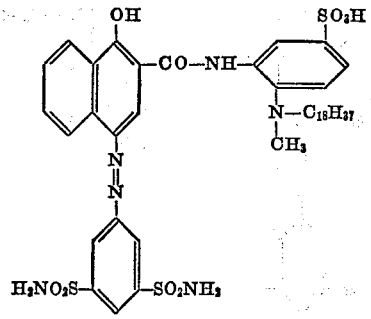

The cyan-forming couplers according to the invention and the red azo masks for use together with them according to the invention may be incorporated with the silver halide emulsion by one of the known methods. If, for example, the compounds are hydrophobic, they are incorporated in known manner by dissolving them in suitable organic solvents, e.g. in esters of aliphatic carboxylic acids, in particular in ethyl acetate, and emulsifying this solution with the silver halide emulsion which is ready for casting. This method may advantageously be modified by simultaneously using oily coupler solvents. This process has been disclosed in U.S. patent specification Nos. 2,304,940 and 2,322,027. If the couplers or masking couplers are alkali-soluble compounds, they may be added to the light sensitive silver halide emulsions in aqueous alkaline solution. The couplers and masking couplers may, of course, be added one after the other to the silver halide emulsion or simultaneously from a common solution. The method by which they are added to the emulsion is not critical and the most suitable process can be easily determined by simple tests. Suitable light sensitive emulsions are emulsions of silver halides such as silver chloride, silver bromide or mixtures thereof, if desired with a small silver iodide content of up to 10 mols percent in one of the usual hydrophilic binders such as protein, in particular gelatine, polyvinyl alcohol, polyvinyl pyrrolidone, cellulose derivatives such as carboxyalkyl cellulose, especially carboxymethyl cellulose, or derivatives of alginic acid.

The emulsions may also contain the usual additives, e.g. spectral or chemical sensitizers, stabilizers, hardeners, plasticizers and the like.

Any color-forming developers which contain a primary amino group may be used for development. It is particularly advantageous to use those of the p-phenylene diamine type, e.g. N,N-dimethyl-p-phenylene diamine, N,N-diethyl-p-phenylene diamine, 2-amino-5-diethyl-aminotoluene, N - butyl-n-$\omega$-sulfobutyl-p-phenylene diamine or 2-amino - 5 - (N - ethyl-N-$\beta$-methanesulfonamidoethylamino)toluene.

EXAMPLE 1

Coupler I/1 is dissolved in 25 ml. of ethyl acetate and, after the addition of 10 g. of dibutyl phthalate, emulsified in 200 ml. of 5% gelatin solution (containing 1.6 g. of the sodium salt of dodecylbenzene sulfonic acid) at 60° C. The emulsion is then mixed with 850 g. of 7.5% gelatin solution which contains 19.25 g. of silver bromide in dispersed form, and, after dilution with water to obtain the required viscosity for casting, the emulsion is poured on a transparent layer support. After drying, the film is exposed behind a grey wedge and developed in a color-developer which contains 2-amino-5-diethylaminotoluene as color-developing substance. After bleaching and fixing, a cyan color wedge is obtained. The absorption maximum of this wedge was determined and its stability in light and moisture was tested under the following conditions:

(a) 1 day in a tropical cupboard (60° C., 95 to 100% relative humidity),
(b) 1 day in hot vacuum (90° C., 2 to 3 mm. Hg),
(c) 30 days exposure to a fluorescent lamp.

The percentage reduction in color density measured at densities of 0.5 and 1.5 is shown in the following table:

| Coupler | $\lambda$max. | Tropical cupboard | | Heating vacuum | | Fluorescent lamp | |
|---|---|---|---|---|---|---|---|
| | | 0.5 | 1.5 | 0.5 | 1.5 | 0.5 | 1.5 |
| (I/1) | 708 | 0 | 0 | 0 | 0 | 0 | 0 |
| (I/2) | 708 | 0 | 0 | 4 | 5 | 0 | 0 |

EXAMPLE 2

20 g. of coupler I/1 are dissolved in 60 ml. of ethyl acetate and emulsified in known manner in 320 ml. of 10% gelatin. The emulsion contains 11 ml. of 10% aqueous saponin solution.

350 ml. of this emulsion are added with stirring to 1 kg. of a photographic silver bromide emulsion which contains 95 g. of gelatin and 0.4 mol of silver.

In addition, 150 ml. of a 5% aqueous alkaline solution of the azo masking coupler II/2 are added.

To this emulsion containing coupler and masking coupler are added 25 ml. of a 1% methanolic solution of 4-hydroxy-6-methyl-1,3,3a,7-tetraazaindene, 30 ml. of a 10% aqueous saponin solution and 15 ml. of 0.5% aqueous chromium acetate solution, and the emulsion is poured out onto a layer support of cellulose triacetate in a thickness of about 4.5$\mu$. The pH of the layer is about 6.5 to 7.

After drying, the material is exposed through a stepless grey wedge and developed for 15 minutes in a developer of the following composition:

5 g. of 2-amino-5-(N-ethyl-N-$\beta$-methanesulfonamido-ethylamino)-toluene sesquisulfate monohydrate,
5 ml. of benzyl alcohol,
2.5 g. of sodium hexametaphosphate,
1.85 g. of anhydrous sodium sulfite,
1.4 g. of sodium bromide,
0.5 mg. of potassium iodide,
12.5 g. of sodium hydroxide
34.22 g. of $Na_2B_4O_7 \cdot 5H_2O$
Water up to 1 litre.

Subsequent processing includes the following baths:

Short stop bath
17 ml. of glacial acetic acid,
2.95 g. of anhydrous sodium acetate,
Water up to 1 litre.

Hardening bath
0.3 g. of sodium hydroxide,
0.5 g. of sodium hexametaphosphate,
9.04 g. of sodium carbonate,
20 ml. of 37% Formalin,
Water up to 1 litre.

Bleaching bath
6 g. of sodium hexametaphosphate,
42.0 g. of potassium ferricyanide,
12.0 g. of potassium bromide,
6.0 g. of disodium phosphate,
16.0 g. of monopotassium phosphate,
Water up to 1 litre.

Fixing bath
150 g. of ammonium thiosulfate,
10 g. of sodium sulfite,
Water up to 1 litre.

Final bath
0.3 g. of sodium tetrapropylene benzene sulfonate,
Water up to 1000 ml.

The processing times after development are as follows:

Short stop bath: 4 minutes
Hardening bath: 4 minutes
Washing: 5 minutes
Bleaching bath: 6 minutes
Washington: 5 minutes
Fixing bath: 8 minutes
Washington: 10 minutes
Final bath: 30 minutes.

A cyan dye is formed in the exposed areas, and the orange-red masking dye is preserved in the unexposed areas. Sensitometric determination shows that excellent masking of the material is obtained in the blue and green ranges of measurement.

EXAMPLE 3

A photographic emulsion is prepared as in Example 2 but instead of 350 ml. of emulsified coupler I/1 it contains 370 ml. of emulsified coupler I/2 and 180 ml. of a 5% solution of the masking coupler II/4.

After processing, which is carried out as described in Example 2, a cyan wedge is again obtained in which there is excellent masking of the yellow and magenta side densities.

What is claimed is:

1. A light sensitive color photographic material comprising at least one silver halide emulsion layer and containing a cyan-forming coupler of the following general formula:

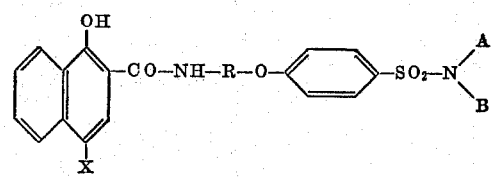

in which:
- X = a hydrogen or halogen atom or a sulfonic acid group,
- R = a saturated bivalent hydrocarbon chain containing up to 6 carbon atoms,
- A = hydrogen atom, or a linear or branched alkyl group containing up to 20 carbon atoms, a cycloalkyl group, an aralkyl group or an aryl group, and
- B = a linear or branched alkyl group containing up to 20 carbon atoms, a cycloalkyl group, an aralkyl group or an aryl group.

2. A color photographic material according to claim 1, which contains in addition an azo red masking coupler of the following general formula:

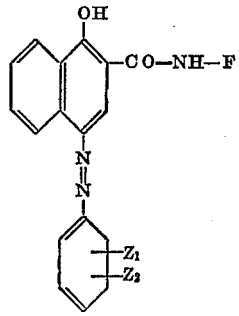

in which:
F = a long chain alkyl group containing 10 to 20 carbon atoms or the group

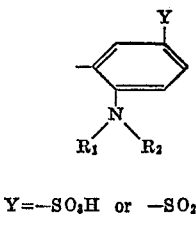

$Y = -SO_3H$ or $-SO_2N\begin{smallmatrix}R_3\\R_4\end{smallmatrix}$;

$Z_1$ and $Z_2$ = the same or different groups $-COR_5$ or $-SO_2R_5$, $R_1$, $R_2$, $R_3$ and $R_4$, which which are the same or different, are hydrogen atoms or alkyl groups, but at least one of the radicals represent an alkyl group containing 10 to 20 carbon atoms, $R_5 = -OH$, an alkoxy group or an amino group.

3. A color photographic material according to claim 2, which contains a cyan-forming coupler of the formula:

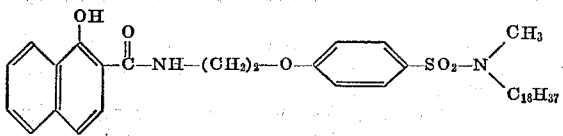

and which contains in addition a red masking coupler of the formula:

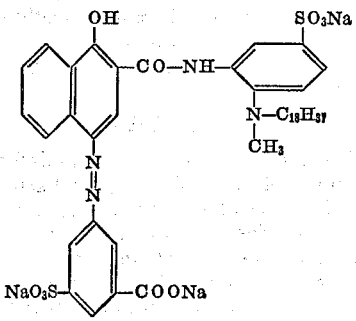

References Cited
UNITED STATES PATENTS

| | | | |
|---|---|---|---|
| 2,628,901 | 2/1953 | Duerr | 96—84 |
| 2,688,539 | 9/1954 | Heimbach et al. | 96—9 |
| 2,698,794 | 1/1955 | Godowsky | 96—97 |
| 3,556,796 | 1/1971 | Eynde et al. | 96—100 |

J. TRAVIS BROWN, Primary Examiner

U.S. Cl. X.R.

96—9, 55

UNITED STATES PATENT OFFICE
CERTIFICATE OF CORRECTION

Patent No. 3,684,515      Dated August 15, 1972

Inventor(s) Walter Schulte et al

It is certified that error appears in the above-identified patent and that said Letters Patent are hereby corrected as shown below:

Column 9, line 49 of the Table, under the heading "Heating Vacuum" the number 4 should read -- 5 -- .

Column 10, line 45, should read -- Final bath: 30 seconds -- .

Signed and sealed this 6th day of February 1973.

(SEAL)
Attest:

EDWARD M. FLETCHER, JR.            ROBERT GOTTSCHALK
Attesting Officer                   Commissioner of Patents